United States Patent
Kendricks

(10) Patent No.: US 10,228,030 B2
(45) Date of Patent: Mar. 12, 2019

(54) MULTI-DISK BRAKE ASSEMBLY WITH TRAVEL LIMIT PIN

(71) Applicant: GOODRICH CORPORATION, Charlotte, NC (US)

(72) Inventor: Warren Kendricks, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/595,244

(22) Filed: May 15, 2017

(65) Prior Publication Data

US 2018/0328423 A1     Nov. 15, 2018

(51) Int. Cl.
| | |
|---|---|
| F16D 55/36 | (2006.01) |
| F16D 55/40 | (2006.01) |
| F16D 65/12 | (2006.01) |
| F16D 55/00 | (2006.01) |
| F16D 55/38 | (2006.01) |
| F16D 65/00 | (2006.01) |

(52) U.S. Cl.
CPC ............ *F16D 55/40* (2013.01); *F16D 55/36* (2013.01); *F16D 65/122* (2013.01); *F16D 55/38* (2013.01); *F16D 65/0043* (2013.01); *F16D 65/126* (2013.01); *F16D 2055/0058* (2013.01)

(58) Field of Classification Search
CPC ........... F16D 55/36; F16D 55/38; F16D 55/40
USPC ....................................................... 188/71.5
See application file for complete search history.

(56) References Cited

U.S. PATENT DOCUMENTS

| | | | | | |
|---|---|---|---|---|---|
| 4,822,556 | A | * | 4/1989 | Cordea | C22C 38/58 148/327 |
| 4,878,563 | A | * | 11/1989 | Baden | F16D 55/36 188/251 A |
| 4,944,370 | A | * | 7/1990 | Chambers | F16D 55/36 188/264 G |
| 5,107,968 | A | * | 4/1992 | Delpassand | B60C 23/18 188/264 G |
| 5,143,184 | A | * | 9/1992 | Snyder | F16D 13/64 188/218 A |
| 5,538,109 | A | * | 7/1996 | Swank | F16D 55/40 188/264 G |
| 5,540,305 | A | * | 7/1996 | Hammond | F16D 55/40 188/18 A |
| 5,558,186 | A | * | 9/1996 | Hyde | F16D 55/40 188/218 XL |
| 5,862,890 | A | * | 1/1999 | Long | F16D 55/36 188/71.5 |
| 5,926,932 | A | * | 7/1999 | Niespodziany | F16D 55/36 188/18 A |
| 5,992,577 | A | * | 11/1999 | Souetre | F16D 55/36 188/196 R |
| 6,119,817 | A | * | 9/2000 | Niespodziany | F16D 55/36 188/18 A |
| 6,340,075 | B1 | * | 1/2002 | Bok | F16D 55/36 188/71.5 |
| 6,532,637 | B1 | * | 3/2003 | Niespodziany | F16D 55/36 188/71.5 |

(Continued)

*Primary Examiner* — Thomas W Irvin
(74) *Attorney, Agent, or Firm* — Snell & Wilmer, L.L.P.

(57) ABSTRACT

A torque tube assembly may comprise a torque tube including a reaction plate and a first travel limit pin coupled to the reaction plate. The first travel limit pin may comprise a shaft portion and a head portion. The first travel limit pin may be configured to limit an axial movement of the reaction plate.

17 Claims, 5 Drawing Sheets

(56) References Cited

U.S. PATENT DOCUMENTS

| | | | | |
|---|---|---|---|---|
| 6,752,248 B2* | 6/2004 | Berwanger | ............ | F16D 55/36 |
| | | | | 188/71.5 |
| 7,124,860 B2* | 10/2006 | Souetre | ................ | F16D 55/36 |
| | | | | 188/71.5 |
| 7,344,006 B2* | 3/2008 | Edmisten | ............... | F16D 55/36 |
| | | | | 188/206 R |
| 7,523,812 B2* | 4/2009 | Thibault | ................ | B60T 13/74 |
| | | | | 188/71.5 |
| 7,866,448 B2* | 1/2011 | Souetre | ................ | F16D 55/36 |
| | | | | 188/18 A |
| 8,037,971 B2* | 10/2011 | Chico | ................... | F16D 55/36 |
| | | | | 188/18 A |
| 8,087,824 B2* | 1/2012 | Bingham | ............... | G01K 1/14 |
| | | | | 374/141 |
| 8,319,384 B2* | 11/2012 | Hanlon | ................. | F16D 65/14 |
| | | | | 310/76 |
| 8,616,344 B2* | 12/2013 | Baden | ................... | F16D 55/36 |
| | | | | 188/71.5 |
| 9,114,791 B2* | 8/2015 | Selles | ..................... | B60T 17/22 |
| 9,127,731 B2 | 9/2015 | Kirkpatrick | | |
| 9,255,632 B2 | 2/2016 | Finney | | |
| 9,616,990 B2* | 4/2017 | Barger | ..................... | B64C 9/30 |
| 2004/0154880 A1* | 8/2004 | Guaraldo | ............. | B60T 13/741 |
| | | | | 188/71.5 |
| 2012/0175198 A1* | 7/2012 | Thibault | ................ | H02K 7/06 |
| | | | | 188/71.5 |
| 2013/0230075 A1* | 9/2013 | Selles | ..................... | B60T 17/22 |
| | | | | 374/141 |
| 2013/0299286 A1* | 11/2013 | Tanty | .................... | B64C 25/42 |
| | | | | 188/71.5 |
| 2015/0001009 A1* | 1/2015 | Chambard | ............. | B60T 1/065 |
| | | | | 188/71.5 |
| 2016/0016653 A1 | 1/2016 | Barger | | |
| 2018/0328425 A1* | 11/2018 | Cooley | ............... | F16D 65/0006 |

* cited by examiner

MULTI-DISK BRAKE ASSEMBLY WITH TRAVEL LIMIT PIN

FIELD

The present disclosure relates to aircraft braking systems, and, more particularly, to a torque tube assembly including a travel limit pin.

BACKGROUND

Aircraft brake systems typically employ a brake stack comprised of a series of friction disks, which may be forced into contact with one another to stop the aircraft. The friction disks are surrounded by a torque tube that may include a reaction plate. The friction disks are compressed towards the reaction plate during braking operations. During a rejected takeoff ("RTO"), an extreme amount of heat may be generated, which can cause the reaction plate to yield, resulting in loss of torque.

SUMMARY

A torque tube assembly is disclosed, in accordance with various embodiments. A torque tube assembly may comprise a torque tube comprising a reaction plate, and a first travel limit pin coupled to the reaction plate.

In various embodiments, the first travel limit pin may comprise a shaft portion and a head portion. The shaft portion of the first travel limit pin may be press fit within an opening in the reaction plate. A surface of the head portion of the first travel limit pin may be configured to complement a contour of a wheel wall. An angle between the head portion and the shaft portion of the first travel limit pin may be about 90°. The first travel limit pin may be configured to contact a portion of a wheel.

In various embodiments, a plurality of travel limit pins may be spaced circumferentially along the reaction plate. The plurality of travel limit pins may include the first travel limit pin. The first travel limit pin may be comprised of at least one of a first steel alloy comprising, in weight percent, 0.75% to 1.0% manganese (Mn), 0.40% to 0.70% nickel (Ni), 0.40% to 0.60% chromium (Cr), 0.38% to 0.43% carbon (C), 0.20% to 0.30% molybdenum (Mo), 0.15% to 0.30% silicon (Si), 0.04% sulfur (S), and 0.0.35% phosphorus (P); a second steel alloy comprising, in weight percent, 0.75% to 1.0% Mn, 0.80% to 1.1% Cr, 0.38% to 0.43% C, 0.15% to 0.25% Mo, 0.15% to 0.30% Si, 0.04% S, and 0.0.35% P; or a third steel alloy comprising, in weight percent, 0.60% to 0.80% Mn, 1.65% to 2.0% Ni, 0.70% to 0.90% Cr, 0.38% to 0.43% C, 0.20% to 0.30% Mo, 0.15% to 0.30% Si, 0.04% S, and 0.0.35% P.

A multi-disk brake system is disclosed, in accordance with various embodiments. A multi-disk brake system may comprise a wheel and a torque tube assembly. The torque tube may comprise a torque tube comprising a reaction plate, and a first travel limit pin disposed between the reaction plate and a wall of the wheel.

In various embodiments, the first travel limit pin may comprise a shaft portion and a head portion. The shaft portion of the first travel limit pin may be disposed in a lip of the reaction plate. A surface of the head portion of the first travel limit pin may be configured to complement a contour of the wall of the wheel. An angle between the head portion and the shaft portion of the first travel limit pin may be about 90°.

In various embodiments, the multi-disk brake system may further comprise a piston and a plurality of friction disks disposed between the piston and the reaction plate of the torque tube. The first travel limit pin may be configured to limit an axial movement of the reaction plate such that the friction disks remain within a stroke distance of the piston. In various embodiments, a plurality of travel limit pins may be circumferentially spaced along the reaction plate. The plurality of travel limit pins may include the first travel limit pin.

In various embodiments, the first travel limit pin may be comprised of at least one of a first steel alloy comprising, in weight percent, 0.75% to 1.0% Mn, 0.40% to 0.70% Ni, 0.40% to 0.60% Cr, 0.38% to 0.43% C, 0.20% to 0.30% Mo, 0.15% to 0.30% Si, 0.04% S, and 0.0.35% P; a second steel alloy comprising, in weight percent, 0.75% to 1.0% Mn, 0.80% to 1.1% Cr, 0.38% to 0.43% C, 0.15% to 0.25% Mo, 0.15% to 0.30% Si, 0.04% S, and 0.0.35% P; or a third steel alloy comprising, in weight percent, 0.60% to 0.80% Mn, 1.65% to 2.0% Ni, 0.70% to 0.90% Cr, 0.38% to 0.43% C, 0.20% to 0.30% Mo, 0.15% to 0.30% Si, 0.04% S, and 0.0.35% P.

In various embodiments, a method of making a torque tube assembly is disclosed. A method of making a torque tube assembly may comprise coupling a first travel limit pin to a reaction plate and configuring a head portion of the first travel limit pin to complement a contour of a wheel.

In various embodiments, the coupling the first travel limit pin to the reaction plate may comprise disposing a shaft portion of the first travel limit pin in the reaction plate. In various embodiments, the method may further comprise disposing a plurality of travel limit pins in the reaction plate, the plurality of travel limit pins including the first travel limit pin, and configuring the plurality of travel limits such that at least one travel limit pin of the plurality of travel limit pins contacts a wall of the wheel after a rejected takeoff.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE D WINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
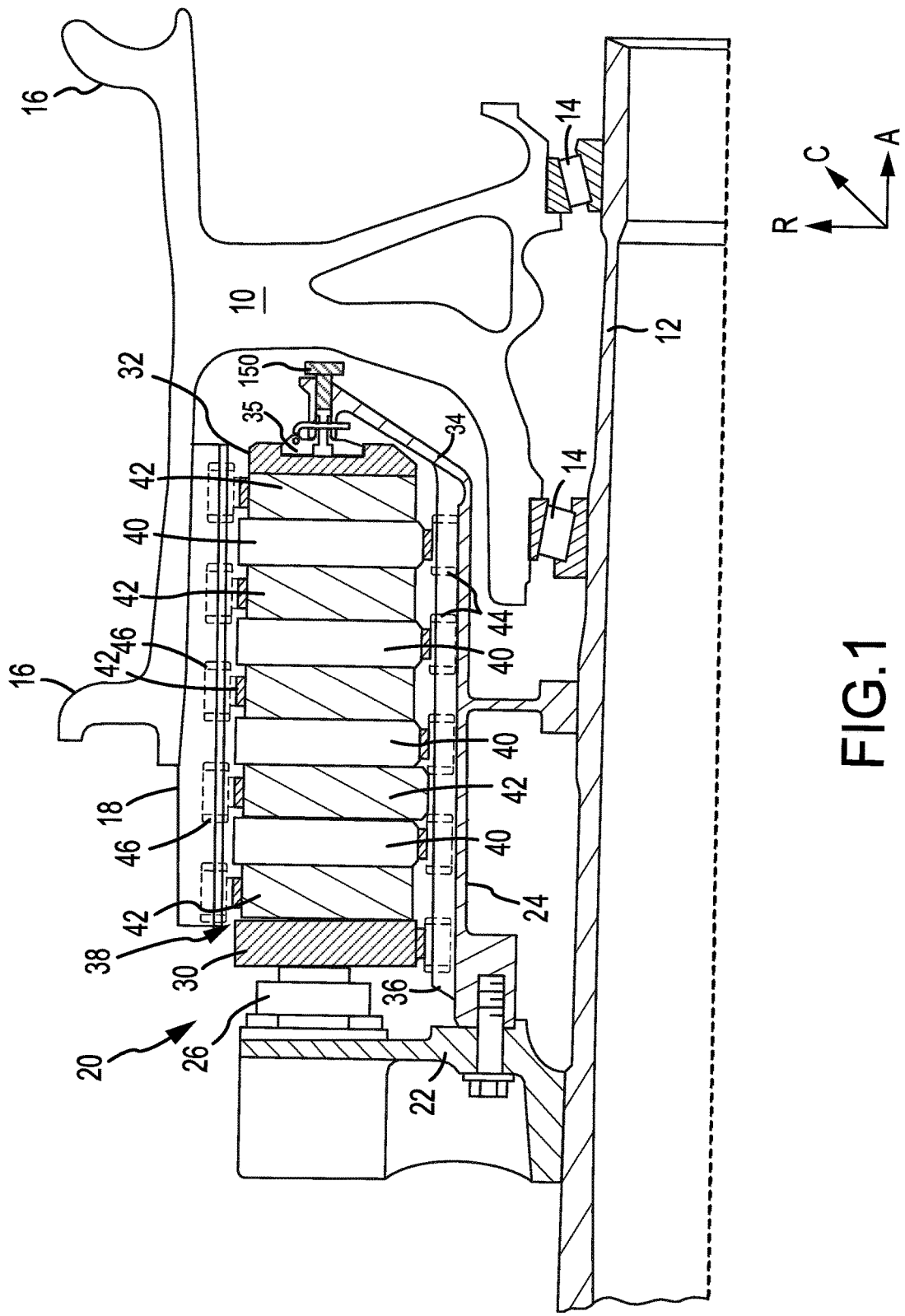
FIG. 1 illustrates a multi-disk brake system comprising a travel limit pin coupled to a torque tube, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Cross hatching lines may be used throughout the figures to denote different parts but not necessarily to denote the same or different materials.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

In the event of a RTO, a large amount of torque may be applied to friction disks of a multi-disk brake system, and an extreme amount of heat may be generated. The heat generated during the RTO may cause the reaction plate of a torque tube in the multi-disk brake system to yield and/or bend. As disclose herein, a travel limit pin may be coupled to the reaction plate. The travel limit pin may limit an axial movement of the reaction plate and allow the multi-disk brake system to generate torque even after a RTO.

With reference to FIG. 1, a multi-disk brake system 20 is illustrated, in accordance with various embodiments. An A-R-C axis has been included in the drawings to illustrate the axial (A), radial (R) and circumferential (C) directions. Multi-disk brake system 20 may include a wheel 10 supported for rotation around axle 12 by bearings 14. Wheel 10 includes rims 16 for supporting a tire, and a series of axially extending rotor splines 18 (one shown). Rotation of wheel 10 is modulated by multi-disk brake system 20. Multi-disk brake system 20 includes piston housing 22, torque tube 24, a plurality of pistons 26 (one shown), pressure plate 30, and end plate 32. Torque tube 24 is an elongated annular structure that includes a tube portion 25, a conical reaction plate 34 (also referred to as a back leg) and a series of axially extending stator splines 36 (one shown). Reaction plate 34 and stator splines 36 may be integral with tube portion 25, as shown in FIG. 1, or they may each be attached to tube portion 25 as separate components.

Multi-disk brake system 20 also includes a plurality of friction disks 38. The plurality of friction disks 38 includes at least one non-rotatable friction disk 40, also known as a stator, and at least one rotatable friction disk 42, also known as a rotor. Each of the friction disks 38 includes an attachment structure. In the embodiment of FIG. 1, each of the four non-rotatable friction disks 40 includes a plurality of stator lugs 44 at circumferentially spaced positions around non-rotatable friction disk 40 as an attachment structure. Similarly, each of the five rotatable friction disks 42 includes a plurality of rotor lugs 46 at circumferentially spaced positions around rotatable friction disk 42 as an attachment structure. In the embodiment of FIG. 1, pressure plate 30, end plate 32, and friction disks 38 are all annular structures made at least partially from a carbon composite material.

Piston housing 22 is mounted to axle 12. Torque tube 24 is bolted or otherwise coupled to piston housing 22 with reaction plate 34 of torque tube 24 proximate an axial center of wheel 10. End plate 32 is connected to, or is otherwise frictionally engaged with, a surface of reaction plate 34 that is facing axially away from the axial center of wheel 10. In various embodiments, one or more pressure pads 35 may be coupled to reaction plate 34 and configured to engage end plate 32. End plate 32 is non-rotatable by virtue of its connection or frictional engagement to torque tube 24. Stator splines 36 may support pressure plate 30 such that pressure plate 30 is also non-rotatable. Stator splines 36 may also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Rotatable friction disks 42 are rotatable by virtue of their engagement with rotor splines 18 of wheel 10.

As shown in FIG. 1, rotatable friction disks 42 are arranged with end plate 32 on an end proximate wheel 10, pressure plate 30 on an end distal wheel 10 and proximate pistons 26, and non-rotatable friction disks 40 interleaved so that rotatable friction disks 42 are adjacent to non-rotatable friction components. Pistons 26 are connected to piston housing 22 at circumferentially spaced positions around piston housing 22. Pistons 26 face axially toward wheel 10 and contact a side of pressure plate 30 opposite rotatable friction disks 42. Pistons 26 may be powered electrically, hydraulically, or pneumatically.

In various embodiments, in response to actuation of pistons 26, a force is exerted on the rotatable friction disks 42 and the non-rotatable friction disks 40 towards reaction plate 34. The rotatable friction disks 42 and the non-rotatable friction disks 40 may thus be pressed together between pressure plate 30 and end plate 32.

In the event of a RTO, a large amount of torque may be applied to friction disks 38 and an extreme amount of heat may be generated. The heat generated during a RTO may cause reaction plate 34 to yield and/or bend toward wheel 10. Stated another way, in the event of a RTO, a structural integrity and/or rigidly of reaction plate 34 may decrease such that reaction plate 34 can no longer withstand the force being applied by piston 26 and reaction plate 34 may be forced toward wheel 10. If reaction plate 34 yields, piston 26 may no longer be able exert the same force on pressure plate 30. Stated another way, piston 26 has a limited amount of stroke (i.e., there is a maximum distance piston 26 can travel in the axial direction toward wheel 10). If reaction plate 34 moves too close to wheel 10, the stroke limit of piston 26 may prevent piston 26 from contacting pressure plate 30. This is more likely to happen in the case of "worn" brakes, where the axial thickness of the rotatable friction disks 42 and the non-rotatable friction disks 40 is reduced due to use over time. In that regard, worn rotatable friction disks 42 and non-rotatable friction disks 40 decrease the axial length of the brake stack, in which case piston 26 extends further axially to compress the brake stack. If piston 26 cannot exert force on pressure plate 30 and/or if reaction plate 34 does not have enough structural integrity to withstand the force being applied by piston 26, multi-disk brake system 20 may cease to generate torque.

In various embodiments, a travel limit pin 150 may be coupled to reaction plate 34. Travel limit pin 150 may comprise a high temperature metal. In various embodiments, travel limit pin 150 may comprise a steel alloy comprising, in weight percent, 0.75% to 1.0% Mn, 0.40% to 0.70% Ni, 0.40% to 0.60% Cr, 0.38% to 0.43% C, 0.20% to 0.30% Mo, 0.15% to 0.30% Si, 0.04% S, and 0.0.35% P. In various embodiments, travel limit pin 150 may comprise a steel alloy comprising, in weight percent, 0.75% to 1.0% Mn, 0.80% to 1.1% Cr, 0.38% to 0.43% C, 0.15% to 0.25% Mo, 0.15% to 0.30% Si, 0.04% S, and 0.0.35% P. In various embodiments, travel limit pin 150 may comprise a steel alloy comprising, in weight percent, 0.60% to 0.80% Mn, 1.65% to 2.0% Ni, 0.70% to 0.90% Cr, 0.38% to 0.43% C, 0.20% to 0.30% Mo, 0.15% to 0.30% Si, 0.04% S, and 0.0.35% P. In various embodiments, travel limit pin 150 may be comprised of a material different from reaction plate 34. For example, travel limit pin 150 may comprise a material having a higher melting point and/or resistance to heat than material of reaction plate 34.

Figure 2:
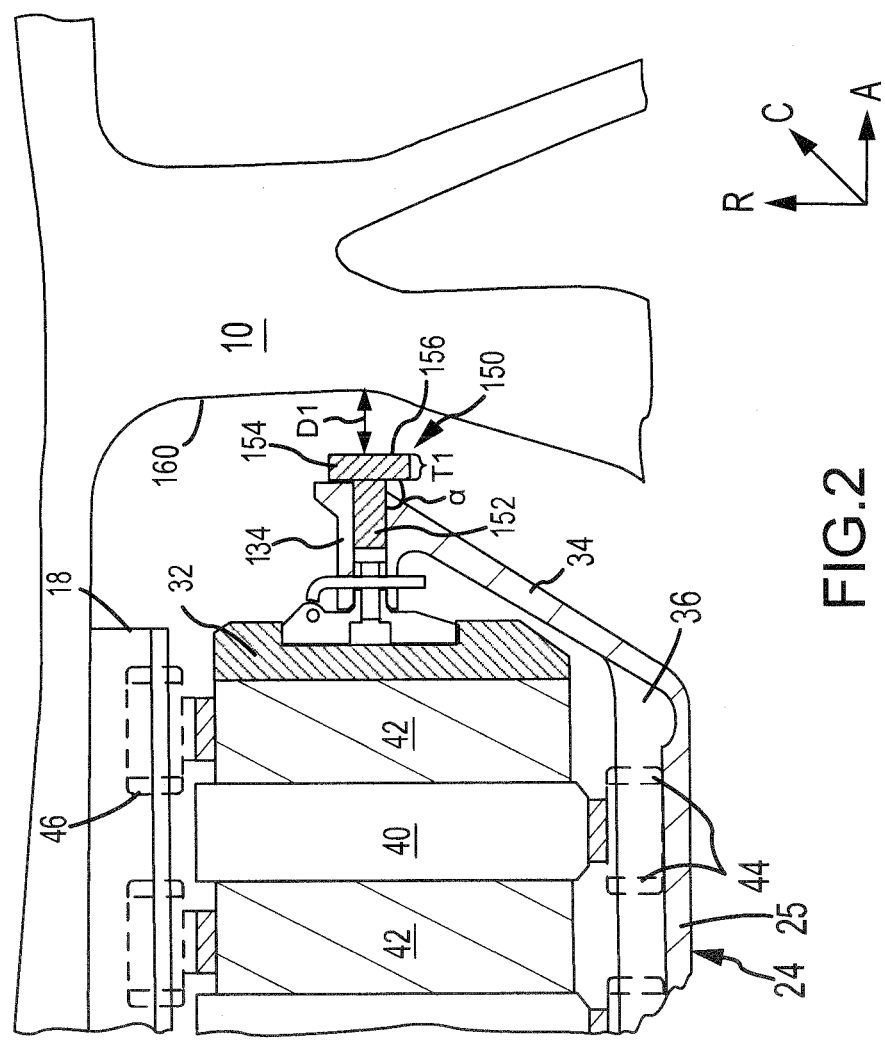
FIG. 2 illustrates a multi-disk brake system comprising a travel limit pin coupled to a torque tube, in accordance with various embodiments.

With reference to FIG. 2, travel limit pin 150 may comprise a shaft portion 152 and a head portion 154. Shaft portion 152 may be disposed within an opening defined by reaction plate 34. Head portion 154 may be oriented toward a wall 160 of wheel 10 (also referred to herein as a wheel wall). In various embodiments, travel limit pin 150 may be press fit into reaction plate 34. In other words, shaft portion 152 of travel limit pin 150 may be driven into a hole, defined by reaction plate 34, that is smaller than shaft portion 152 (i.e., has a smaller diameter and/or width than shaft portion 152), such that travel limit pin 150 may be held tightly within reaction plate 34. In various embodiments, travel limit pin 150 may be threaded through and/or bolted to reaction plate 34.

Head portion 154 of travel limit pin 150 may include a surface 156 that is oriented toward wall 160 of wheel 10. In various embodiments, surface 156 may be a flat or planar surface. In various embodiments, surface 156 may be curved or otherwise configured to complement and/or mirror a contour of wall 160. In various embodiments, a cross-section of head portion 154, normal to shaft portion 152, may be comprise a circular shape, oval shape, square shape, rectangular shape, triangular shape, or any other geometric shape. In various embodiments, an angle α between shaft portion 152 and head portion 154 may be about 90°, as used herein the term "about" means±5.0°. In various embodiments, angle α may be an obtuse angle. For example, in various embodiments, angle α may be between about 105° and about 165°, wherein the term "about" in this context only means+/−1°. In various embodiments, angle α may be an acute angle. For example, in various embodiments, angle α may be between about 15° and about 85°, wherein the term "about" in this context only means+/−1°. Head portion 154 and shaft portion 152 may be configured such that angle α tends to maximize a surface area of contact between wall 160 and surface 156 of head portion 154.

Figure 6:
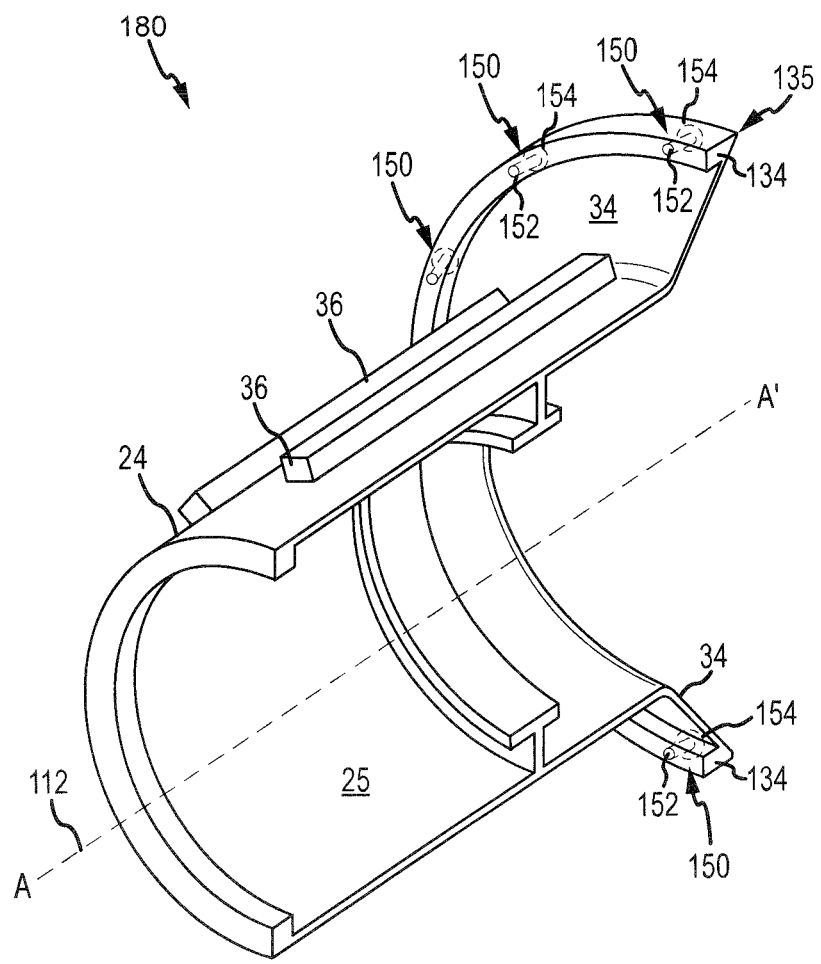
FIG. 6 illustrates a torque tube assembly, in accordance with various embodiments.

With reference to FIG. 6, torque tube assembly 180 is illustrated, in accordance with various embodiment. Torque tube assembly 180 includes torque tube 24 and one or more travel limit pins 150 coupled to reaction plate 34. In various embodiments, reaction plate 34 may be a frustoconical flange extending from tube portion 25 toward wheel 10 (FIG. 1). In various embodiments, reaction plate 34 includes a lip 134. Lip 134 may be an annular structure located proximate a radially outward end, or an outer circumference 135, of reaction plate 34. Lip 134 may extend toward end plate 32, with momentary reference to FIG. 2. In various embodiments, shaft portion 152 of travel limit pins 150 may be disposed in lip 134 of reaction plate 34.

In various embodiments, a plurality of travel limit pins 150 may be coupled to reaction plate 34 of torque tube 24. Travel limit pins 150 may be circumferentially spaced along reaction plate 34. In various embodiments, torque tube assembly 180 includes between three (3) travel limit pins 150 and twelve (12) travel limit pins 150.

With combined reference to FIG. 6 and FIG. 2, a location of travel limit pins 150 in reaction plate 34 may be selected to maximize a number of travel limit pins 150 that may contact a portion of wall 160 after a RTO. For example, in various embodiments, one or more openings may be formed in wall 160. As such, a radial distance between travel limit pins 150 and axis of rotation 112, and/or a circumferential distance between adjacent travel limit pins 150 may be selected such that at least one of the travel limit pins 150 will contact wall 160 after an RTO. State another way, travel limit pins 150 may be configured and/or located in reaction plate 34 such that after a RTO at least one of the travel limit pins 150 will not fall within the openings in wheel 10 (i.e., will not be axially aligned with the openings in wheel 10).

Returning to FIG. 2, travel limit pins 150 may be configured such that a distance D1 between surface 156 of travel limit pin 150 and wall 160 is between 0.050 inches and 1.5 inches (i.e., between 1.52 cm and 3.81 cm). In various embodiments, D1 may between 0.100 inches and 1.0 inches (i.e., between 0.254 cm and 2.54 cm). Travel limit pins 150 are configured such that travel limit pins 150 will not contact wall 160 unless reaction plate 34 yields.

Figure 3:
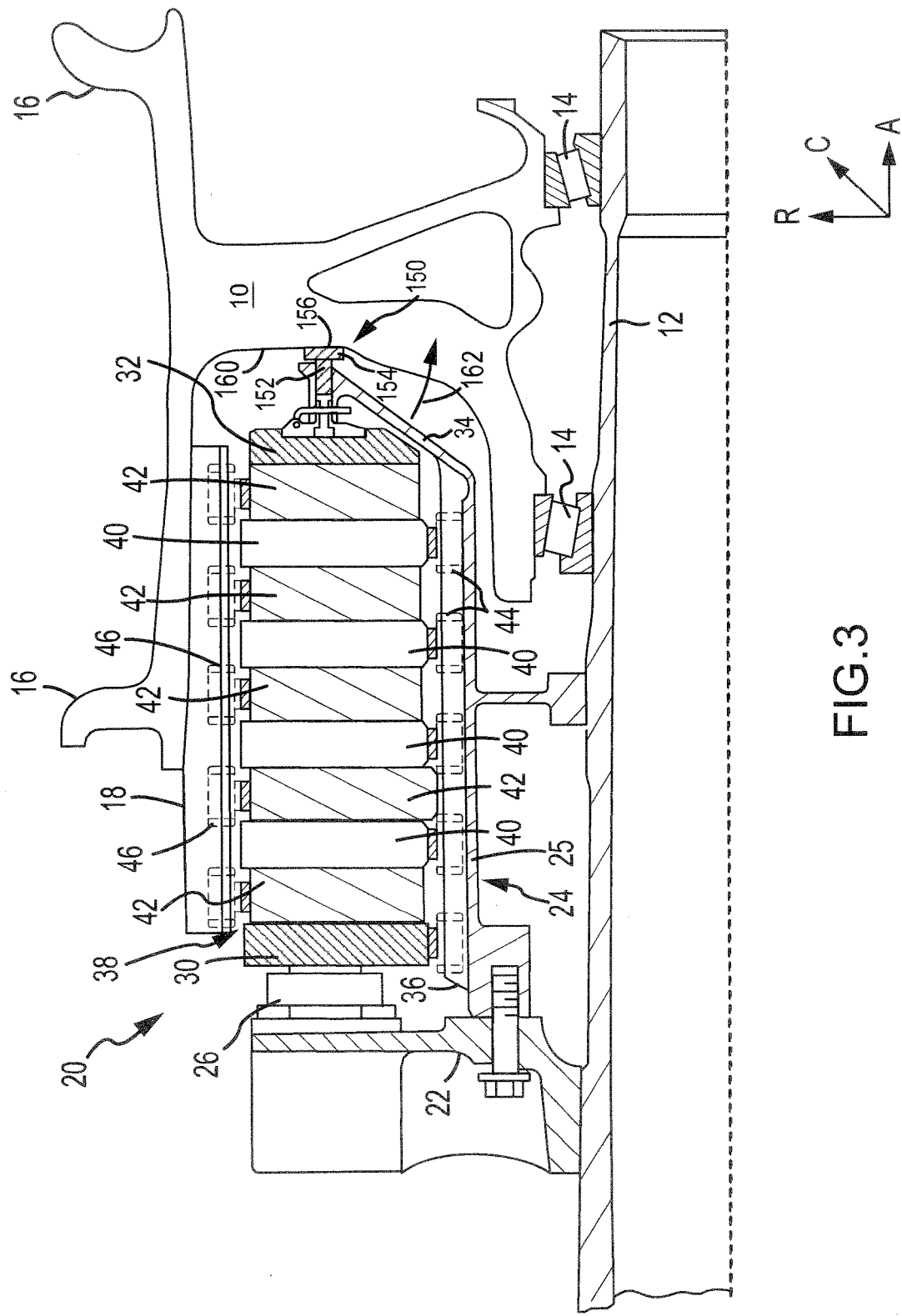
FIG. 3 illustrates a multi-disk brake system comprising a travel limit pin coupled to a torque tube after a RTO, in accordance with various embodiments.

With reference to FIG. 3, a configuration of multi-disk brake system 20, after a RTO is illustrated, in accordance with various embodiments. A force applied by piston 26 on pressure plate 30 may cause reaction plate 34 to begin to yield and/or move in the direction of arrow 162. Reaction plate 34 may move in the direction of arrow 162, until head portion 154 of travel limit pin 150 comes into contact with wall 160. Stated another way, travel limit pin 150 contacting wall 160 may limit the movement of reaction plate 34 in the direction of arrow 162. Travel limit pin 150 may be configured such that, when head portion 154 contacts wall 160, piston 26 will not be at maximum stroke. In other words, a thickness T1, with momentary reference to FIG. 2, of head portion 154 may be selected such that, when surface 156 comes into contact with wall 160, piston 26 will still be able to contact and apply force to pressure plate 30. Stated yet another way, travel limit pin 150 may be configured to limit an axial movement of reaction plate 34 such that friction disks 38 will remain within a stroke distance of piston 26. Accordingly, travel limit pin 150 may allow multi-disk brake system 20 to continue generating torque after a RTO.

In various embodiments, after a RTO, travel limit pin 150 being in contact with wall 160 may allow for application of the aircraft's parking brake. Stated differently, travel limit pin 150 pressing against wall 160 and limiting a yielding of reaction plate 34, may keep the brake stack within the stroke distance of piston 26 and create a static structure for friction disks 38 and, more specifically, for end plate 32 to press against after a RTO. Thus, travel limit pin 150 may allow the brake stack to be held or locked in a compressed state to prevent rotation of wheel 10, and allow for a "parking" of the aircraft after a RTO.

Figure 4:
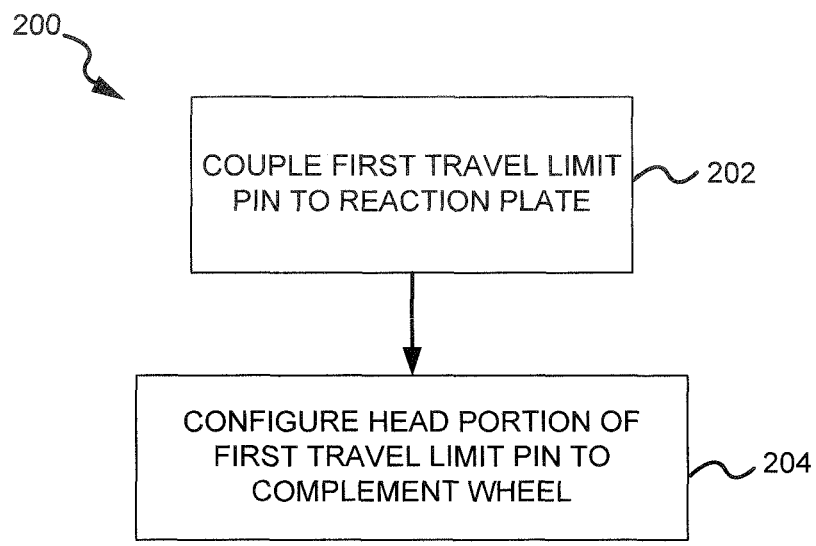
FIGS. 4 and 5 illustrate a method of making a torque tube assembly, in accordance with various embodiments.

With reference to FIG. 4, a method 200 of making a torque tube assembly is illustrated, in accordance with various embodiments. Method 200 may comprise coupling a first travel limit pin to a reaction plate (step 202), and configuring a head portion of the first travel limit pin to complement a wheel (step 204).

In various embodiments, with combined reference to FIG. 2, FIG. 6, and FIG. 4, step 202 may comprise coupling a first travel limit pin 150 to reaction plate 34. Step 204 may include configuring head portion 154 of the first travel limit pin 150 to complement wheel 10.

Figure 5:
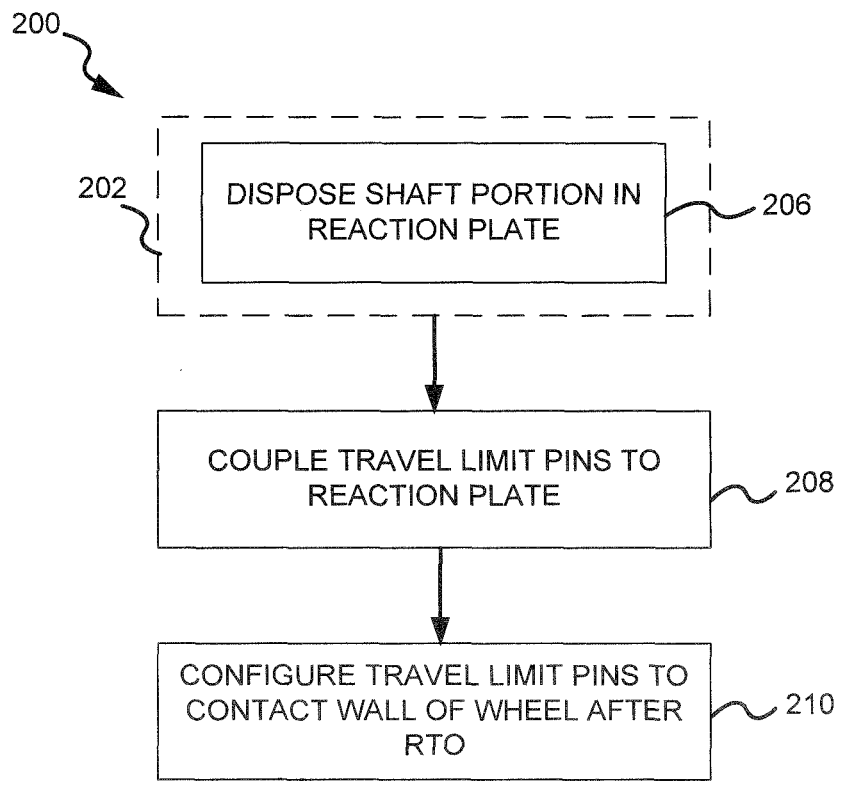

With reference to FIG. 5, in various embodiments, step 202 of method 200 may include disposing a shaft portion of the travel limit pin in the reaction plate (step 206). In various embodiment, method 200 may further include coupling a plurality of travel limit pins to the reaction plate (step 208), and configuring the plurality of travel limit pins such that at least one travel limit pin of the plurality of travel limit pins will contact a wall of the wheel after a RTO (step 210).

In various embodiments, with combined reference to FIG. 3, FIG. 6, and FIG. 5, step 206 may include disposing shaft portion 152 of the travel limit pin 150 in reaction plate 34. Step 208 may include coupling a plurality of travel limit pins 150 to reaction plate 34. Step 210 may include configuring the plurality of travel limit pins 150 such that at least one travel limit pin of the plurality of travel limit pins will contact wall 160 of wheel 10 after a RTO.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque tube assembly for a multi-disk brake system including a plurality of friction disks, comprising:
a torque tube comprising a reaction plate, the reaction plate comprising a lip located at a radially outward end of the reaction plate, wherein the lip is configured to extend toward the plurality of friction disks;
a pressure pad coupled to the reaction plate; and
a first travel limit pin extending into the lip of the reaction plate, wherein the first travel limit pin terminates prior to the pressure pad.

2. The torque tube assembly of claim 1, wherein the first travel limit pin comprises a shaft portion and a head portion.

3. The torque tube assembly of claim 2, wherein the shaft portion of the first travel limit pin is press fit within an opening in the reaction plate.

4. The torque tube assembly of claim 2, wherein a surface of the head portion of the first travel limit pin is configured to complement a contour of a wheel wall.

5. The torque tube assembly of claim 2, wherein an angle between the head portion and the shaft portion of the first travel limit pin is about 90°.

6. The torque tube assembly of claim 1, further comprising a plurality of travel limit pins spaced circumferentially along the reaction plate, the plurality of travel limit pins including the first travel limit pin.

7. The torque tube assembly of claim 1, wherein the first travel limit pin is comprised of at least one of:
a first steel alloy comprising, in weight percent, 0.75% to 1.0% Manganese (Mn), 0.40% to 0.70% nickel (Ni), 0.40% to 0.60% chromium (Cr), 0.38% to 0.43% carbon (C), 0.20% to 0.30% molybdenum (Mo), 0.15% to 0.30% silicon (Si), 0.04% sulfur (S), and 0.0.35% phosphorus (P);
a second steel alloy comprising, in weight percent, 0.75% to 1.0% Mn, 0.80% to 1.1% Cr, 0.38% to 0.43% C, 0.15% to 0.25% Mo, 0.15% to 0.30% Si, 0.04% S, and 0.0.35% P; or
a third steel alloy comprising, in weight percent, 0.60% to 0.80% Mn, 1.65% to 2.0% Ni, 0.70% to 0.90% Cr, 0.38% to 0.43% C, 0.20% to 0.30% Mo, 0.15% to 0.30% Si, 0.04% S, and 0.0.35% P.

8. The torque tube assembly of claim 1, wherein the first travel limit pin is configured to contact a portion of a wheel.

9. A multi-disk brake system, comprising:
a plurality of friction disks;
a piston configured to apply a force to the plurality of friction disks;
a wheel; and
a torque tube assembly, the torque tube assembly comprising:
a torque tube comprising a reaction plate, the reaction plate comprising a lip located at a radially outward end of the reaction plate,
a pressure pad coupled to the reaction plate, and
a first travel limit pin disposed between the reaction plate and a wall of the wheel, wherein the first travel limit pin extends into the lip of the reaction plate and terminates prior to the pressure pad, and wherein a distance between the first travel limit pin and the wall of the wheel is less than a maximum stroke distance of the piston.

10. The multi-disk brake system of claim 9, wherein the first travel limit pin comprises a shaft portion and a head portion.

11. The multi-disk brake system of claim 10, wherein the shaft portion of the first travel limit pin is disposed in the lip of the reaction plate.

12. The multi-disk brake system of claim 10, wherein a surface of the head portion of the first travel limit pin is configured to complement a contour of the wall of the wheel.

13. The multi-disk brake system of claim 10, wherein an angle between the head portion and the shaft portion of the first travel limit pin is about 90°.

14. The multi-disk brake system of claim 10, wherein a thickness of the head portion of the first travel limit pin is configured to limit an axial movement of the reaction plate such that the plurality of friction disks remain within a stroke of the piston.

15. The multi-disk brake system of claim 9, wherein the first travel limit pin is configured to limit an axial movement of the reaction plate such that in a worn state the plurality of friction disks remain within a stroke of the piston.

16. The multi-disk brake system of claim 9, wherein the first travel limit pin is comprised of at least one of:
a first steel alloy comprising, in weight percent, 0.75% to 1.0% Manganese (Mn), 0.40% to 0.70% nickel (Ni), 0.40% to 0.60% chromium (Cr), 0.38% to 0.43% carbon (C), 0.20% to 0.30% molybdenum (Mo), 0.15% to 0.30% silicon (Si), 0.04% sulfur (S), and 0.0.35% phosphorus (P);
a second steel alloy comprising, in weight percent, 0.75% to 1.0% Mn, 0.80% to 1.1% Cr, 0.38% to 0.43% C, 0.15% to 0.25% Mo, 0.15% to 0.30% Si, 0.04% S, and 0.0.35% P; or
a third steel alloy comprising, in weight percent, 0.60% to 0.80% Mn, 1.65% to 2.0% Ni, 0.70% to 0.90% Cr, 0.38% to 0.43% C, 0.20% to 0.30% Mo, 0.15% to 0.30% Si, 0.04% S, and 0.0.35% P.

17. The multi-disk brake system of claim 9, wherein the torque tube assembly further comprises a plurality of travel limit pins circumferentially spaced along the reaction plate, the plurality of travel limit pins including the first travel limit pin.

* * * * *